July 3, 1962
E. LINSKER
3,041,897
AUTOMATIC MACHINE TOOL
Filed April 8, 1959
3 Sheets-Sheet 1
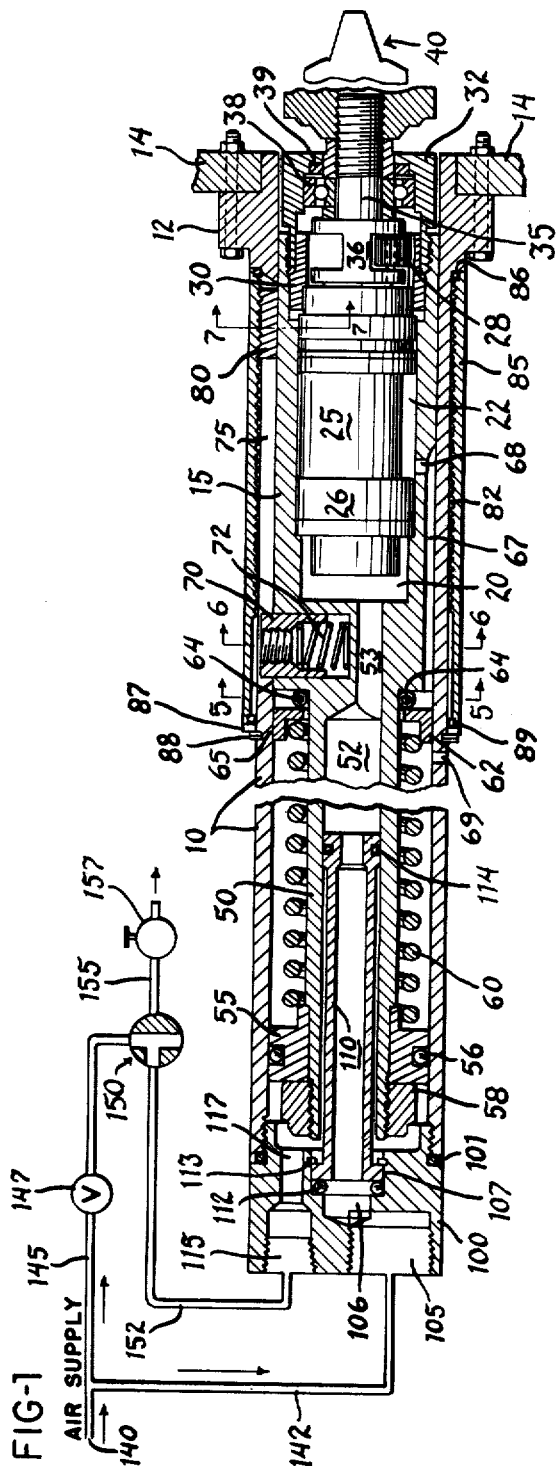
INVENTOR.
EUGENE LINSKER
BY
Marechal, Biebel, French & Bugg
ATTORNEYS

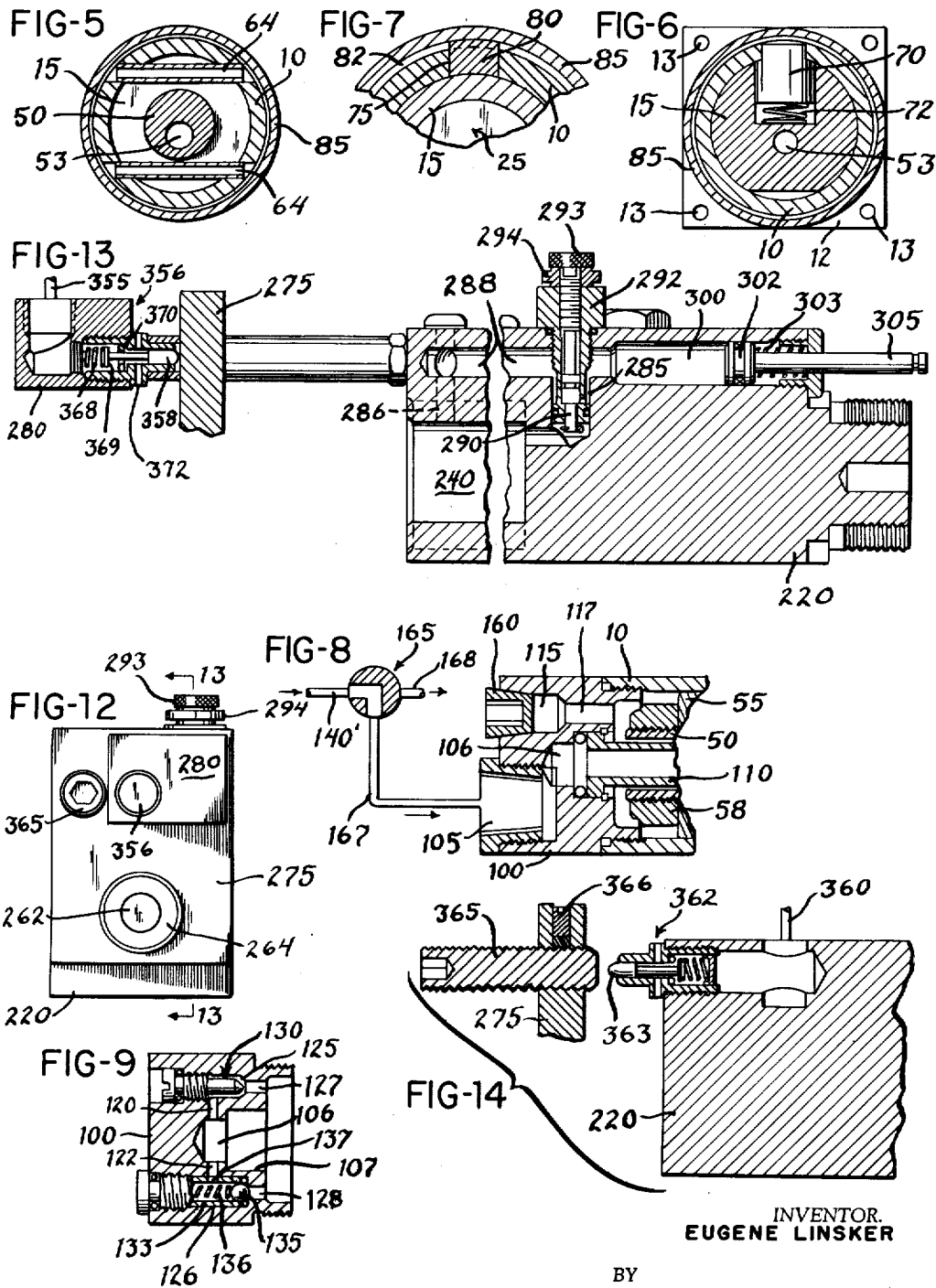

INVENTOR.
EUGENE LINSKER

BY
Marechal, Biebel, French & Bugg
ATTORNEYS

United States Patent Office 3,041,897
Patented July 3, 1962

3,041,897
AUTOMATIC MACHINE TOOL
Eugene Linsker, Dayton, Ohio, assignor to Buckeye Tool
Corporation, Dayton, Ohio, a corporation of Ohio
Filed Apr. 8, 1959, Ser. No. 804,993
5 Claims. (Cl. 77—33.5)

This invention relates to automatic machine tools for driving rotary cutting tools and simultaneously moving the cutting tools through prescribed linear motions, as in feeding and retracting the tool.

There is an increasing demand for machine tools capable of performing a number of operations simultaneously, or in sequence, at a single station to avoid a plurality of separate operations on work pieces. Such tools may be constructed about a basic type of tool such as a lathe, milling machine, or the like, or may be built up as special tools incorporating modules or machine tool units mounted on special jigs or the like to perform such plurality of operations, and possibly including automatic programming controls by means of which the simultaneous or sequenced operation of the modules may be coordinated. Such modular tools preferably should have versatility of operation, since they may be required to perform a wide variety of machining operations, ranging for example from simply drilling holes to performing a sequence such as drilling, tapping, countersinking, etc. The present invention is particularly concerned with such modular type tools, and with a module or unit which may be used in multiples, or together with other machine tools.

In some of the more fundamental types of operations required of these tools, a simple forward or linear action feed of the rotary cutting tool may be all that is necessary, and the tool may be returned, for example, by spring pressure. In such cases the simple single-acting linear action motor is sufficient for providing the feed stroke of the tool. In other more complicated uses, as where a higher return force is needed, or where a controlled return is necessary, it may be desirable to have a double-acting type of linear action motor providing the feed operation.

Pneumatic rotary motors are particularly adapted to such automatic tool construction, since they provide high speed and relatively great power from a motor having substantially small cross-section, and thus the cross-section of space occupied by the tool may be kept to a minimum. In combination with the use of such motors it is customary to provide a linear action pneumatic motor of the piston-cylinder type for the tool feed power and control. In some set-ups it may be desirable to control the supply of pneumatic pressure fluid to the rotary motor and the linear action motor concurrently, in other words supplying both motors from the same control source. In other situations, it may be desirable to supply and control these two motors of the tool separately, for example to maintain rotation of the rotary motor during a reverse or retracting stroke of the linear action motor.

The primary object of this invention is to provide an improved automatic machine tool which is so constructed as to be readily adaptable for use with a single-acting or double-acting feed, or to be controlled selectively from common or separate controlled power fluid supplies.

Another object of the invention is to provide such a tool wherein check systems and automatic stops may be incorporated in the basic machine construction while maintaining the cross-sectional dimensions of the tool close to the minimum cross-section of the main tool casing.

Another object of this invention is to provide in a tool as above described a novel system for controlling feed pressure of the linear action feed motor, at least during a portion of its stroke, together with novel hydraulic reservoir construction and an indicator for observance of the hydraulic fluid supply currently in the reservoir.

Another object of the invention is to provide a novel portable machine tool construction including interchangeable fittings which adapt the tool to a wide variety of set-ups and uses.

Other objects and advantages of the invention will be apparent from the following description, the accompanying drawings and the appended claims.

In the drawings:

FIG. 1 is a broken sectional view taken longitudinally of the basic tool construction in accordance with the invention, with the rotary pneumatic motor shown in elevation, and with a suitable pneumatic supply system shown schematically;

FIG. 2 is a view looking toward the rear of left-hand side of FIG. 1;

FIG. 3 is a section through the rear fitting of the tool, taken on line 3—3 of FIG. 2;

FIG. 4 is a sectional view taken on line 4—4 of FIG. 3;

FIG. 5 is a sectional view on line 5—5 of FIG. 1;

FIG. 6 is another section taken on line 6—6 of FIG. 1;

FIG. 7 is a partial section taken on line 7—7 of FIG. 1;

FIG. 8 is a partial sectional view of the rear fitting of the tool as in FIG. 1, illustrating a modified use thereof with another pneumatic supply system;

FIG. 9 is a view similar to FIG. 3 illustrating the modifications used with the circuit of FIG. 8;

FIG. 12 is a rear elevational view of the fittings shown in FIGS. 10 and 11;

FIG. 13 is a sectional view taken on line 13—13 of FIG. 12; and

FIG. 14 is a partial sectional view showing details of an adjustable stop construction incorporated in the modified fitting shown in FIGS. 10–13.

Figure 10:
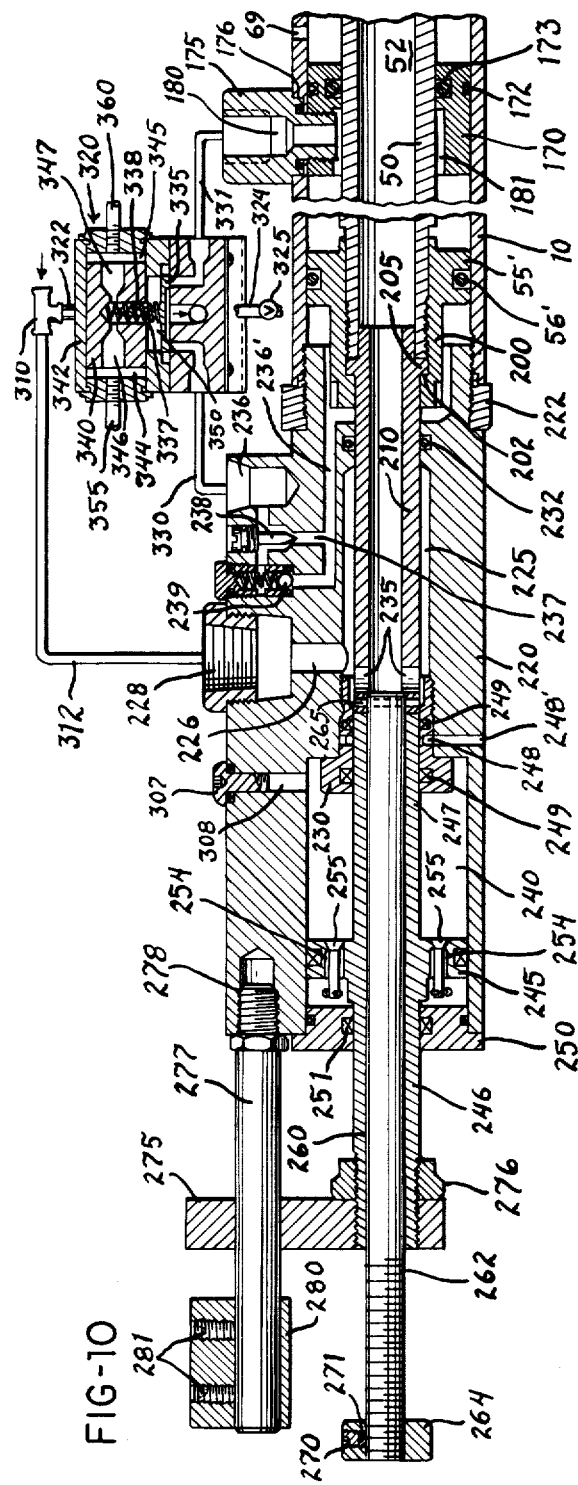
FIG. 10 is a longitudinal section through a modified form of the invention, showing details of another control fitting which may be substituted for that shown in FIGS. 1–4, and also showing adaptation of the linear action motor to double-acting operation.
Figure 11:
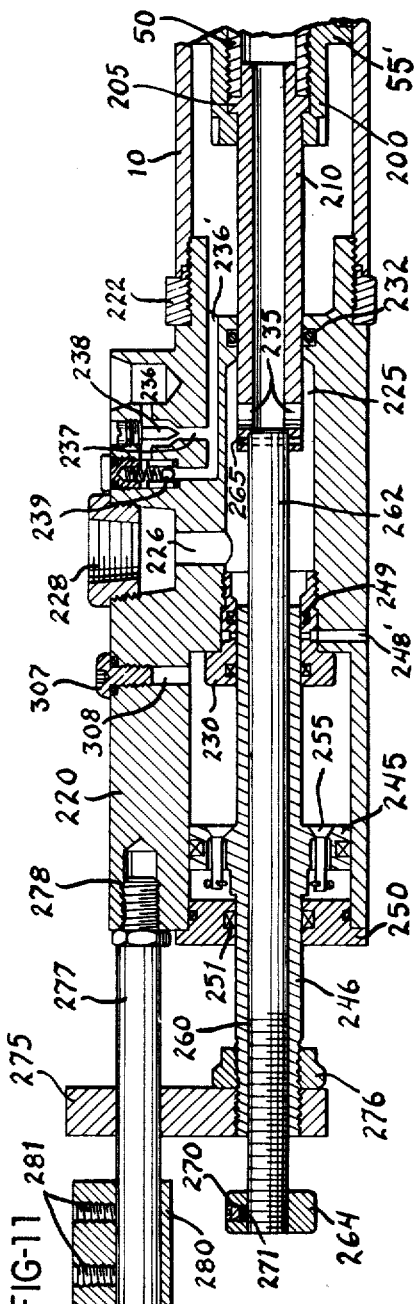
FIG. 11 is a view similar to FIG. 10 showing parts of the control fitting in a moved position.

Referring to the drawings, which illustrate preferred embodiments of the present invention, the basic structure of the tool includes a tubular casing 10 having a mounting flange 12 at the forward or nose end thereof, and including holes 13 (FIG. 6) for receiving mounting bolts or the like by which the flange may be secured to a jig plate or the like indicated schematically at 14. Within the tubular casing, at the forward end thereof, is a hollow headpiece 15 including an interior having an air supply chamber 20 and a forwardly spaced exhaust chamber 22 of slightly greater diameter.

A rotary air motor 25, for example of the well known sliding-vane type, is received within headpiece 15, and includes a land 26 which separates the supply and exhaust chambers from each other as shown. This motor may include suitable reduction gearing shown generally at 28, and including an internal gear 30 of a planetary gear set which is clamped in place by a retainer 32 threaded into the forward end of headpiece 15. The output of the gear set is through spindle 35 which is formed integrally with the cage 36, and journaled within a forward bearing 38 which is supported in the retainer 32. A seal ring 39 also surrounds the forward end of spindle 35.

A conventional chuck, shown schematically at 40, is mounted, as by threading, on the end of spindle 35. This chuck may carry a rotary cutting tool, such as a drill, reamer, or the like, and the entire unit, including headpiece 15 is adapted to move axially of casing 10 while motor 25 rotates the cutting tool.

The feed movement of the headpiece is derived from a linear action pneumatic motor which includes a hollow piston rod 50 extending rearwardly of headpiece 15, and preferably formed integrally therewith. The piston rod includes an internal passage 52 which is connected by a passage 53 in the rear of the headpiece to the supply chamber 20 of the rotary motor. A piston 55, preferably carrying a surrounding O-ring 56, is retained on the end of piston rod 50 by a lock nut 58 which is suitably threaded to the end of the hollow rod 50.

The forward face of piston 55 is engaged by a return spring 60, since in the embodiment shown in FIG. 1 the linear action motor is single-acting. This spring seats at its forward end within an abutment cup 62 which is retained in position by a pair of roll pins 64 (FIGS. 1 and 5) which pass through the casing 10, and against which the cup 62 is seated by force of spring 60. Preferably, the cup is of greater interior diameter than the piston rod 50, providing passage for exhaust air which is received through the exhaust passage 67, formed in one edge of headpiece 15 and communicating through a short cross passage 68 with the exhaust chamber 22. Exhaust air passing the retaining cup 62 then may pass to atmosphere through opening 69 in the side walls of casing 10. This somewhat tortuous path of the exhaust air functions effectively to muffle the sound of the relatively high velocity exhaust from the rotary motor.

The headpiece 15 is prevented from rotating during linear movement thereof by a key piece 70 which is loaded by a light spring 72 to extend within a slot 75 formed longitudinally in the forward end of casing 10, behind the mounting flange 12. An adjustable abutment or stop for determining the forward feed limit of the tool is provided by a stop segment 80 having a threaded outer surface (FIG. 7) which is engaged with the internal thread 82 in an adjustment sleeve 85. This sleeve surrounds the forward end of casing 10, engaging a shoulder 86 at its forward end, and retained in position at its rearward end by a washer 87 engaged with a snap ring 88. Preferably, the front and rearward ends of sleeve 85 also encompass O-ring seals 89. It will be obvious from inspection of this construction, together with the above description, that rotation of sleeve 85 will move the abutment piece 80 to a desired seating, and that the key 70 will engage therewith to limit forward or feed movement of headpiece 15, and hence to limit the feed movement of the cutting tool.

The rearward end of casing 10 is closed by a fitting 100 which is threaded into the end of casing 10 around an O-ring 101 to provide an effective seal therebetween. The fitting includes a main field supply opening 105 which communicates with a central bore 106 therein, and a counterbore 107 is formed in the forward end thereof receiving the enlarged head of a hollow tube 110. This tube seats against O-ring 112 and is retained in place by a snap ring 113. It projects forwardly into the hollow or interior passage 52 of piston rod 50 and is in sealing engagement with the walls thereof, preferably including an O-ring 114 at its forward head. This construction provides a feed passage for fluid such as air under pressure to the rotary motor 25, and by reason of the telescopic engagement of piston rod 50 and tube 110, this feed passage is maintained throughout linear movement of the piston rod and headpiece. The fitting 100 also includes an auxiliary inlet opening 115 which is connected through a passage 117 to the interior of the casing providing a direct supply passage for fluid under pressure to operate against piston 55 and produce movement of the linear action feed motor.

Referring to FIGS. 3, 4, 8 and 9, the central bore 106 is joined through passages 120 and 122, respectively, into small chambers 125 and 126 which are in turn connected through passages 127 and 128 into the space behind piston 55, or in other words into free communication with the passage 117. An adjustable needle valve 130 is threaded within the chamber 125 to control the opening thereof into passage 127. A plug 132 (FIG. 3) or a check valve fitting 133 (FIG. 9) of the same size may alternately be threaded within chamber 126. The fitting 133 carries within it a ball check valve 135 normally seated by spring 136. The interior of the check valve fitting communicates through an opening 137 with chamber 126 and passage 122. This check valve arrangement provides for flow through passage 127 only in the direction from the linear action motor chamber toward the passage 122 and bore 106.

With the needle valve 130 closed and plug 132 in position, as shown in FIG. 3, a constant supply of fluid pressure, for example, compressed air, may be supplied from a source 140 through a line 142 (FIG. 1) to the main fluid supply opening, and thence through bore 106, tube 110, and the passages 52 and 53 to the supply chamber 20 of the rotary motor 25. At the same time, pressure fluid may be admitted through line 145 which is also connected to source 140, past a metering valve 147 to a three-way control valve 150 which may be operated in any suitable manner to connect the supply line 145 to a line 152 communicating with the auxiliary inlet opening 115, whereby pressure fluid is admitted through passage 117 to the interior of casing 10 behind piston 55, and thus this piston will advance against spring 60. Then, if valve 150 is operated to connect line 152 to an exhaust line 155 and shut off the connection to supply line 145, the return spring 60 will move piston 55 rearwardly and the pressure fluid will be exhausted through line 152. The exhaust rate preferably is controlled by a suitable metering valve 157 in the exhaust line 155.

In the alternative arrangement, shown in FIGS. 8 and 9, the auxiliary inlet 115 is closed off with a plug 160, the needle valve 130 is retracted, as shown in FIG. 9, to open a flow path between passages 120 and 127, and the plug 132 is replaced by the check valve fitting 133. The pressure air supply 140' (FIG. 8) is then connected through a three-way control valve 165 which may be operated in any suitable manner to connect the supply line 167 alternately to the pressure fluid supply 140' or to an exhaust line 168. Line 167 is connected to the main inlet 105, and pressure fluid is supplied from bore 106 to the rotary motor in the same path as described above. In addition, the pressure fluid may pass the needle valve 130 and enter behind piston 55 through passage 127. Obviously, a selected setting of needle valve 130 will control the advance rate of the linear action motor. On the return stroke of this motor, with valve 165 moved to connect line 167 to exhaust, the restriction provided by needle valve 130 may cause an undesirable delay in the return stroke, and for this purpose the check valve 135 effectively bypasses the needle valve and provides for a more rapid return of the linear action motor to its retracted position, the position shown in FIG. 1.

From the above description, it is clear that by simple manipulation of the needle valve 130 and connection of the main and auxiliary pressure fluid inlets in any desirable circuit, for example the two relatively basic circuits disclosed, the tool may be adapted to a number of different types of control as desired with no major changes in construction.

It is also possible to remove the return spring 60 and provide a double-acting linear action motor in those instances where higher retracting forces and/or a more precise control over the return or retracting stroke may be desirable. For this purpose, referring to FIG. 10, spring 60 and cup 62 are removed and a bulkhead 170, carrying external and internal O-ring seals 172 and 173, respectively, is positioned in the casing 10 immediately to the rear of the exhaust opening 69. This bulkhead is retained in place by a connector 175 which is passed through a counterbored opening 176 in the wall of casing 10 and threaded into the bulkhead 170 as shown. The connector includes an internal passage 180 which opens into an annular chamber 181 provided within bulkhead 170 and opening on the front side of piston 55. Obviously, this connector and bulkhead arrangement for providing a double-acting linear action motor may be used in conjunction with the fitting 100 described in FIGS. 1–9, although it is not specifically illustrated in combination therewith. In practice, use of the double-acting feed motor will require suitable alternate control of pressure fluid supply to the rear or forward sides of piston 55. This may be accomplished in any conventional manner.

In furthering the adaptability of the present tool to a wide variety of applications, a system of feed thrust check and feed stops is provided, as shown in FIGS. 10–14, which may be adapted to the above described basic tool construction without any substantial modification therein. This system includes automatic control of the forward and reverse movements of the double-acting type of linear action feed motor, which may be more adaptable than the single-acting type to such automatic control.

Thus, referring to FIG. 10, the piston 55 is replaced by a piston member 55′ having a surrounding seal ring 56′ and including an extended internally threaded tail portion 200 threadable upon the rear end of the piston rod 50, in place of nut 58. This tail portion includes an internal shoulder 202 which engages a flange 205 on an extended feed and control tube 210 projecting rearwardly of the piston rod 50. A modified control fitting 220 is threaded to the rear end of casing 10 in place of the fitting 100, and is retained in a desired position about the axis thereof by means of a lock nut 222. This fitting includes a chamber 225 into which the tube 210 projects, and this chamber is in turn connected through passage 226 to a pressure fluid inlet 228 through which the pressure fluid supply to the rotary air motor may be maintained.

The rear end of chamber 225 is closed by a sleeve 230 threaded within the end of chamber 225, and at the front end of this chamber an O-ring seal 232 is provided. Radial passages 235 through tube 210 place it in constant communication with chamber 225 throughout reciprocating movement of the tube with the piston rod 50, thereby maintaining the supply of pressure fluid to the interior passage 52 of the piston rod, from whence this pressure fluid passes to the motor supply chamber 20 (FIG. 1).

The pressure fluid feed supply to the rear side of piston 55′ is through an inlet opening 236 and passage 236′ to the interior of casing 10, as shown in FIG. 10, while the return pressure fluid supply is through the connector 175 and bulkhead 170, as previously described. The passage 236′ is connected to inlet 236 by a cross passage 237 controlled by a needle valve 238 which in turn may be bypassed through an opening controlled by a check valve 239 which avoids the buildup of a back pressure in passage 236′ during the return stroke of the piston.

The rear end of the alternate fitting 220 includes an enlarged cylinder chamber 240 within which a control piston 245 is mounted for reciprocating movement. This control piston includes elongated rod portions 246 and 247, preferably formed integrally therewith, and extending at the forward end through the sleeve 230. This sleeve includes an annular chamber 248, which is connected to atmosphere through vent 248′, and annular stationary seals 249 are provided on opposite sides of chamber 248, to prevent entry of pressure air into the hydraulic system. The rearward portion 246 passes through the closure member 250 and its seal member 251. Control piston 245 contains bypass passages 254 therethrough, each controlled by a poppet-type check valve 225 which is arranged to seat and close the bypass when the control piston moves forwardly, left to right in FIG. 10, and to unseat and thus permit flow through the passages 254 in the control piston on movement of that piston in a retracting stroke, right to left.

The control piston and the elongated rod portions thereof have a central passage 260 which is aligned with the passage in control tube 210, and a control rod 262 having a threaded rear end, which carries an adjustable stop nut 264, extends through the control piston, being operatively secured to the rear end of control tube 210 by a cross pin 265. This structure provides a lost motion type connection between the operating piston 55′ of the linear action or feed motor and the control piston 245, such that the motor may operate freely through an initial portion of its feeding or advancing stroke before it is engaged with the control piston, which provides a predetermined retarding force. The length of this travel is determined by the setting of the stop nut 264, and this stop nut preferably includes a locking screw 270 which may be threaded down upon a plastic retainer disc 271, providing resistance to loosening of the screw due to vibration or the like, and also protects the threads on rod 262.

At its rearward end, threaded upon the rod portion 246, the control piston carries a control plate 275 which is secured in position by lock nut 276. This plate is also engaged in sliding relation about a stationary guide rod 277 threadably fastened in a tapped bore 278 in the rear face of fitting 220, and carrying an adjustable stop block 280 at the outer end thereof which is retained in a desired position by a pair of lock screws 281 which are similar to the locking screw 270.

Referring to FIG. 13, opposite ends of cylinder 240 are connected through transverse passages 285 and 286 to a bypass passage 288, and flow through this passage, when the control piston moves in its advancing or feeding direction, is controlled by a needle valve 290 carried in a fitting 292 which may be threaded into position within the passage 285. Adjustment of the setting of needle valve 290, as by rotation of its knurled head 293 and stop nut 294, will determine the rate of flow through the bypass passage, and thus the resistance to feed movement which may be provided by the control piston.

The bypass passage 288 also communicates with a reservoir 300 containing a piston 302 which is normally biased by spring 303 in a direction reducing the volume of the reservoir. This piston includes an indicator rod 305 which extends outwardly of fitting 220 to provide a visual reference to the quantity of hydraulic fluid within reservoir 300. Thus, when the operator notes that the indicator rod is substantially retracted within the fitting, he realizes that it is time to replenish the supply of hydraulic fluid.

The arrangement shown in FIGS. 10–14 is capable of use with many different types of controls. A typical circuit is shown in connection with FIGS. 10, 13 and 14, wherein compressed air is supplied to a T 310 which opens into a supply line 312 connected into the main air supply opening for passage of motive fluid to the rotary motor 25, through the chamber 225, the hollow control tube 210 and the hollow piston rod 50. The T 310 is also connected to a feed control servomotor 320 through a line 322.

The valve 320 is a conventional four-way control valve having an inlet connection from line 322 and an exhaust connection 324 which may be controlled by a manually adjustable valve 325 or in any other suitable manner. The valve includes control passages 330 and 331 which are connected to the fittings or feed air openings 237 and 175, respectively. These passages may be connected selectively to pressure or exhaust, under the control of a reciprocable control shuttle member or D-valve assembly 335 having an extended stem 337 which is surrounded by a positioning spring 338. Stem 337 and the spring extend into a central bore in a control piston 340 which is slidably mounted in cylinder 342, defining control chambers 344 and 345 at opposite ends thereof which are connected by passages 346 and 347, respectively, to the central bore of the piston within which the stem 337 extends. The pressure inlet line 322 is connected into a chamber 350 above valve member 335, and thus with the system in balance, as shown in FIG. 10, chambers 344 and 345 are subject to equal pressure, and air under pressure is contained in chamber 350.

Chamber 346 is connected through a line 355, to any suitable starting signal source, by means of which a signal, in the form of a reduction in pressure in line 355, will cause piston 340 to shift to the left (FIG. 10). A sensing valve 356 (FIG. 13) including a sensing head 358 is positioned in the stock block 280, extending forwardly for engagement with the control plate 275 as shown. This valve may be used to lower pressure in a line 359, for sending a signal to indicate that this module tool has completed its operating cycle. Chamber 347 is connected through a line 360 (FIGS. 10 and 14) to a similar sensing valve 362 which is supported in the rear face of fitting 220, having its sensing head 363 projecting rearwardly of the fitting for engagement by an anjustable stop screw 365 which is threaded into the control plate 275 and retained in an adjusted position by a set screw 366.

Referring to FIG. 13, the sensing valves, which are of conventional construction, include a biasing spring 368 which normally urges sensing head 358 closed, seating the valve plate 369 thereof against an O-ring 370 which surrounds the internal cavity of the sensing valve, and particularly the passages 372 thereof which communicate with atmosphere behind the sensing head 358, normally closing off the passage 359 (or 360 in the case of valve 362) to maintain pressure within the respective lines. For example, when the sensing head 363 is pushed against its biasing spring, pressure air in the corresponding control chamber 347 will be exhausted, and the piston 340 will shift accordingly to connect line 331 to operate the linear action feed motor, i.e., piston 55'. Metering of the exhaust air flow, by appropriate adjustment of valve 325 will control the delay required for the shuttle or servo valve 340 to reverse its position.

Thus, as will be clear from the above description, assuming that the feed stroke of the tool has commenced, the control tube 210 will pull rod 262 forward, eventually engaging the stop nut 264 with the control plate 275 and the rearward rod portion of control piston 245.

After the control piston comes into effect its poppet check valve 255 will seat and the control piston then moves forward against the resistance of the hydraulic fluid flowing through the adjustable needle valve 290 and the control bypass 288. This provides a retarding force during the final portion of the advancing stroke, as determined by the setting of the stop nut 264 on rod 262. When the control plate 275 reaches a forward position wherein the control or stop screw 365 engages the sensing head of valve 362, then line 360 will be connected to atmosphere, pressure will drop in chamber 347 and the servo valve will shift to the right, as viewed in FIG. 10, connecting line 331 to pressure and supplying pressure air through the connector fitting 175 to the forward face of feed piston 55, whereby the retracting or reverse stroke will begin. This action is coordinated with the front stop adjustment, i.e., the stop 80 as set by sleeve 85, such that this stop provides the actual or fine adjustment, while the delay control and the setting of stop screw 365 are appropriately coordinated to delay reversal of the servo valve until the final or fine adjustment stop 80 is engaged.

At the end of the reversing stroke control plate 275 will open the control valve 356, exhausting pressure in control line 359 and thus providing a signal that the tool module has ended its cycle of operation. The tool will remain in this position until a starting pulse is received through line 355.

Under some circumstances it may be desirable to shut off the supply of pressure fluid to the rotary motor at the fully retracted position, as by means of a suitable remote control valve (not shown) in line 312. Or, in the absence of such a separate control valve the feed of pressure air to the rotary motor may be throttled in the fully retracted position by appropriate dimensioning of the rear end of control tube 210 and the chamber within the forward portion of sleeve 230, wherein the control tube extends at the fully retracted position (FIG. 10). Thus these parts may provide a sufficient restriction to slow the rotary motor to an idling speed and conserve on power in this manner.

From the foregoing description it will be apparent that this invention provides a machine tool construction which is adaptable to a wide variety of uses, ranging from the simple single-acting feed and single-supply system (FIGS. 1 and 8) to the full double-acting feed and automatic control shown in FIGS. 10–14. The basic tool structure for all of these arrangements and uses is the same, and the changes may be made by simple application of fittings, plugs, etc., which may for the most part be applied while the tool is actually in position upon a jig or the like, if so desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A power tool of the character described comprising a tubular casing having mounting means adjacent one end thereof, a piston in said casing defining therewith a linear action fluid motor, a hollow piston rod extending from said piston toward said one end of said casing, a hollow headpiece supported for sliding movement in said one end of said casing and secured to said piston rod for movement therewith, passage means connecting the interiors of said piston rod and said headpiece, a rotary fluid motor mounted in said headpiece and adapted to receive a supply of motive fluid through said passage means, means for mounting a cutting tool for rotation by said rotary motor and for linear movement with respect to said one end of said casing together with said piston rod and said headpiece, a fitting at the other end of said casing including means for supplying pressure to said linear action motor and said rotary motor selectively from separate sources and from a commonly controlled single source, a bulkhead dimensioned to fit within said casing in surrounding relation to said piston rod defining a variable volume chamber with said piston on the opposite side thereof from said fitting, and means for supporting said bulkhead in fixed position within said casing including a passage adapted for connection to supply operating fluid to said chamber and to convert said linear action motor from single-acting to double-acting type.

2. Apparatus as defined in claim 1 wherein said supporting means for said bulk head is operable for removal of said bulk head, and an abutment cup receivable in a fixed position within said casing forward of said piston to provide a fixed abutment against which a return spring can react to exert a return force upon said piston when said tool is converted as a single-acting feed tool.

3. A power tool of the character described comprising a tubular casing having mounting means adjacent one end thereof, a piston in said casing defining therewith a linear action fluid motor, a hollow piston rod extending from said piston toward said one end of said casing, a hollow headpiece supported for sliding movement in said one end of said casing and secured to said piston rod for movement therewith, passage means connecting the interiors of said piston rod and said headpiece, a rotary fluid motor mounted in said headpiece and adapted to receive a supply of motive fluid through said passage means, means for mounting a cutting tool for rotation by said rotary motor and for linear movement with respect to said one end of said casing together with said piston and said headpiece, a removable fitting secured in sealing relation to the other end of said casing, said fitting including means for supplying pressure fluid separately to said linear action motor and said rotary motor, means forming a closed cylinder in said fitting, a control piston in said closed cylinder having hollow rod portions projecting from both ends of said closed cylinder and sealed thereto, means providing a lost-motion connection between said control piston and said piston of said linear action motor including a control rod fixed to said hollow piston rod and extending through said hollow rod portions of said control piston outwardly of said closed cylinder, means for impeding movement of said control piston only during travel thereof in a direction corresponding to tool feeding movement of said linear action motor, and an adjustable stop member on said control rod accessible at the exterior of said fitting to adjust the limit of relative movement between said hollow piston rod and said control piston in a direction feeding a cutting tool.

4. Apparatus as defined in claim 3, wherein said means for impeding movement of said control piston includes passage means formed in said fitting connecting opposite ends of said closed cylinder for flow of control fluid between opposite sides of said control piston, and selectively operable valve means in said passage means for adjustably impeding the movement of the control piston in that direction corresponding to tool feeding movement.

5. Apparatus as defined in claim 3, including seal means surrounding that said rod portion which extends from said control piston toward said supply means for directing pressure fluid to said motors, seal means surrounding such said rod portion to seal against leakage of liquid from said closed cylinder around said rod portion and against leakage of pressure fluid from said supply means, and means defining a vented chamber cooperating with said seal means to vent any escape pressure fluid from said supply means preventing entry of pressure fluid into said closed cylinder.

References Cited in the file of this patent
UNITED STATES PATENTS

| | | |
|---|---|---|
| 1,998,873 | Kingsbury | Apr. 23, 1935 |
| 2,580,751 | Fletcher | Jan. 1, 1952 |
| 2,676,572 | Perry et al. | Apr. 27, 1954 |
| 2,881,589 | Hitt et al. | Apr. 14, 1959 |
| 2,913,934 | Quackenbush | Nov. 24, 1959 |

UNITED STATES PATENT OFFICE
CERTIFICATE OF CORRECTION

Patent No. 3,041,897                                                July 3, 1962

Eugene Linsker

It is hereby certified that error appears in the above numbered patent requiring correction and that the said Letters Patent should read as corrected below.

In the grant, lines 2 and 12, and in the heading to the printed specification, lines 3 and 4, name of assignee, for "Buckeye Tool Corporation", each occurrence, read -- Buckeye Tools Corporation --.

Signed and sealed this 13th day of November 1962.

(SEAL)
Attest:

ERNEST W. SWIDER
Attesting Officer

DAVID L. LADD
Commissioner of Patents